United States Patent [19]

Feldbrugge

[11] Patent Number: 5,241,639
[45] Date of Patent: Aug. 31, 1993

[54] METHOD FOR UPDATING DATA FROM A CACHE ADDRESS LOCATION TO MAIN MEMORY AND MAINTAINING THE CACHE ADDRESS IN REGISTRATION MEMORY

[75] Inventor: Fredericus H. J. Feldbrugge, Beekbergen, Netherlands

[73] Assignee: Digital Equipment Corporation, Maynard, Mass.

[21] Appl. No.: 300,403

[22] Filed: Jan. 19, 1989

[30] Foreign Application Priority Data

Jan. 25, 1988 [NL] Netherlands .................. 8800158

[51] Int. Cl.⁵ .............................................. G06F 12/08
[52] U.S. Cl. ............................. 395/425; 364/DIG. 1; 364/261.2
[58] Field of Search ... 364/200 MS File, 900 MS File; 395/425

[56] References Cited

U.S. PATENT DOCUMENTS

| | | | |
|---|---|---|---|
| 3,878,513 | 4/1975 | Werner | 364/200 |
| 4,074,254 | 2/1978 | Belser et al. | 364/900 |
| 4,322,815 | 3/1982 | Broughton | 364/900 |
| 4,654,819 | 3/1987 | Stiffler et al. | 364/900 |
| 4,890,226 | 12/1989 | Ztoh | 364/200 |
| 4,916,603 | 4/1990 | Ryan et al. | 364/200 |

*Primary Examiner*—Thomas C. Lee
*Attorney, Agent, or Firm*—Barry N. Young; Ronald C. Hudgens

[57] ABSTRACT

Disclosed is a method for operating a cache memory. In response to a write transaction, data is written to a location in a foreground memory that is part of the cache. A modified bit is set in the foreground memory indicating that the data must be written back to main memory. A registration bit is checked in the foreground memory location to determine whether the address is registered. The location of the foreground memory is written to a registration memory in the cache if the registration bit is not set. The registration bit is set in the foreground memory, in conjunction with writing the address of the memory location to the registration memory, to indicate that the address has been registered. In response to a subsequent transaction, the foreground memory location can be selected to store new required data. The modified bit is checked to determine whether the data stored in the foreground memory location must be written back to main memory before the location can be used to store the new data. The data stored in the foreground memory location is written back to the main memory if the modified bit is set. The foreground memory location is filled with the new data while the cache address of the new data and the previous state of the registration bit are retained in the registration memory. The modified bit is cleared in conjunction with filling the foreground memory location with the new data.

1 Claim, 1 Drawing Sheet

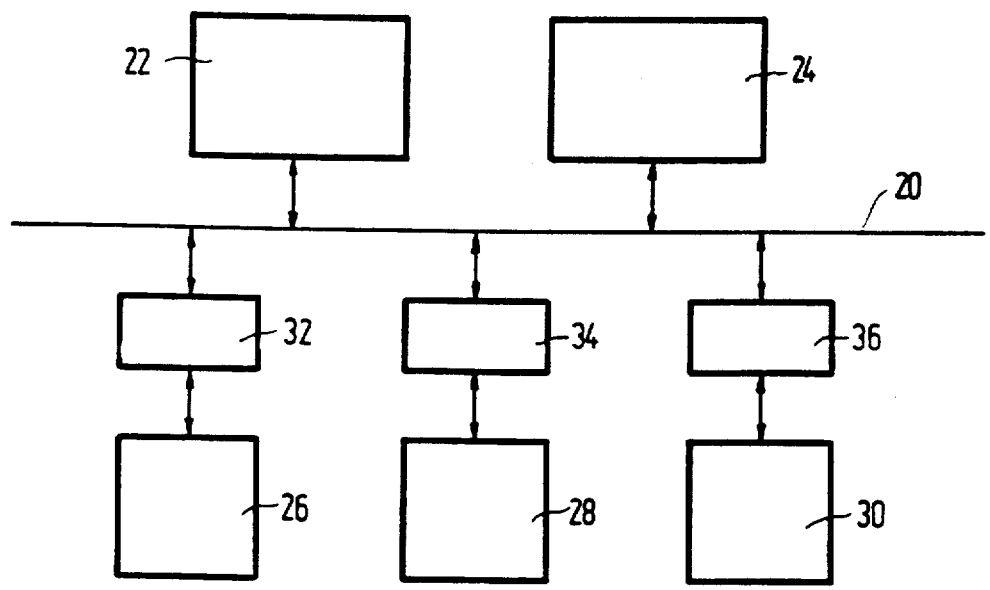
FIG. 1
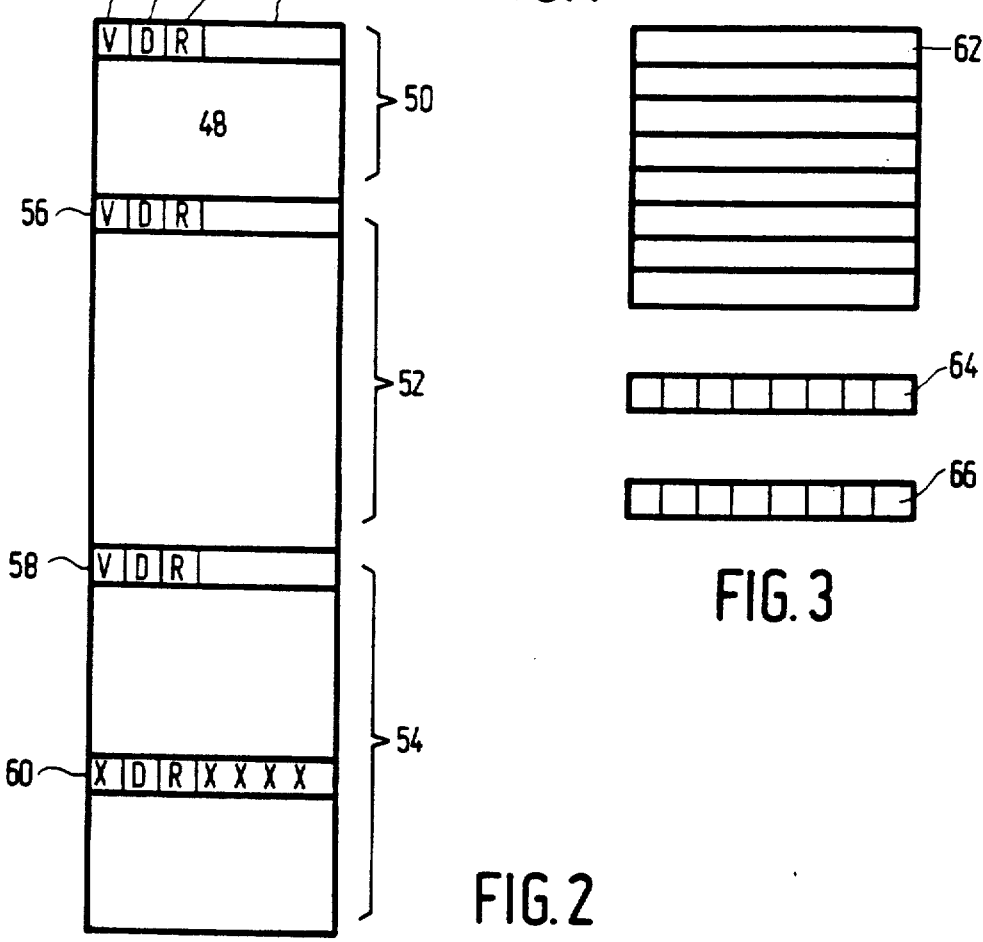
FIG. 3
FIG. 2

METHOD FOR UPDATING DATA FROM A CACHE ADDRESS LOCATION TO MAIN MEMORY AND MAINTAINING THE CACHE ADDRESS IN REGISTRATION MEMORY

BACKGROUND OF THE INVENTION

The invention relates to a computer system, comprising sub-systems in the form of a processor with a foreground memory, a main memory and a communication network which interconnects said sub-systems, the foreground memory being suitable for temporarily storing at least one information block from the main memory for privileged use by the processor, for each first memory location in the foreground memory there being provided a validity bit (valid) in order to indicate valid information storage therein and a modification bit (dirty) in order to indicate a modification effected therein.

SELECTED RECITATION OF PRIOR ART

As principal reference applicant cites EP Patent Application 19358, corresponding GB Patent Application 7916021 of May 9, 1979 and U.S. Pat. No. 4,322,815, herein incorporated by reference. When the processor wishes to read information, a block containing this information is transferred from the main memory to the foreground memory. The privileged foreground memory offers faster access either because of a technologically faster implementation and/or because of the fact that no transport operation is required via the communication system (bus or otherwise). Upon the transfer to the foreground memory, a validity bit of the relevat location is set to the position "valid", the main memory address or another identification of the relevant memory block is stored in an associative organization, together with the location in the foreground memory. Thus, it is locally known which memory blocks are present. If the information present in the foreground memory is subsequently modified, such a modification is indicated by switching over the modification bit. It is not strictly necessary for the validity bit and the modification bit to cover the same memory capacity; this capacity may be smaller for the modification bit. The modification bit indicates that the local information is not in conformity with the version of the same information present in the main memory. This is not objectionable if the relevant information is of importance only to the processor or a process executed therein. At given instants, however, it will be necessary to update the information in the main memory on the basis of the modified information present in the foreground memory. There are generally two reasons for updating:

a. storage space in the foreground memory is required for the storage of other information crucial to the processor (ousting);

b. the execution of the current process is temporarily or definitely terminated and the associated information is no longer required locally (flushing). All memory locations used for the relevant process can now be copied to the main memory. In principle, acceleration is achieved if only the contents of the modified memory locations are copied. If no further steps are taken, this implies that all addresses of the relevant locations must be addressed. A direct search operation is time consuming and an associative search operation would imply a complex addition to the equipment.

SUMMARY OF THE INVENTION.

Among other things, it is an object of the present invention to provide a computer system of the kind set forth in the Background of the Invention in which the copying of modified information can be copied to the main memory within a short period of time by simple means. In accordance with one aspect of the invention this is achieved in that there is provided a registration memory which comprises a sequence of further memory locations in which write operations can be performed in a predetermined first address sequence and which can be directly read thereafter in a predetermined second address sequence in order to store in each of said further memory locations the address of an associated first location for which a said modification has taken place. The registration memory can be direct-addressed, so that a complex associative operation can be dispensed with. The first and the second address sequence may be directly related as in a FIFO memory or a LIFO memory. In the former case the address sequences are the same during write and read operations, and in the second case they are opposed. A third possibility consists in a cyclically addressable buffer memory. Fast reading is then realized in that it is always immediately known where the next information is stored, without it being necessary to address void locations. Such memories implemented in a RAM are known per se. Furthermore, in principle other memory organizations having the same attractive properties are also feasible. The simple organization is achieved notably in that the information in the foreground memory is not stored in a sorted manner and need not be sorted.

It is a preferred aspect of the invention that for each of said first memory locations there is provided a registration bit in order to indicate that the associated address has been stored in the registration memory. This will avoid an overflow condition for the registration memory.

Further attractive aspects will be evident in the following.

BRIEF DESCRIPTION OF THE FIGURES

The invention will be described in detail hereinafter with reference to some Figures. Therein:

FIG. 1 shows a lay-out of a computer system in accordance with the invention;

FIG. 2 shows a block diagram of a foreground memory;

FIG. 3 shows a block diagram of a registration memory.

DESCRIPTION OF A PREFERRED EMBODIMENT

FIG. 1 shows a lay-out of a computer system in accordance with the invention. Block 22 denotes a main memory which is constructed, for example, as a large RAM having a capacity in the megabyte range. Block 24 denotes a background memory, for example a battery of disc memories. The blocks 26, 28, 30 denote three processors. Each processor comprises a local memory 32, 34, 36 in RAM technology which usually has a comparatively small storage capacity in comparison with that of the memory 22. The respective sub-systems are interconnected by means of a communication system 20 which is in this exemplary case formed by a bus. The facilities for the assignment of the bus have been omitted for the sake of simplicity. The construction of the system may be simpler, for example it may comprise only one processor or the background memory may be absent. Alternatively the system may be more complex or may form part of a more complex system. The local memory comprises (not separately shown) the foreground memory, the registration memory, and possibly further memories which are not relevant in its context.

FIG. 2 shows a block diagram of a foreground memory. It comprises three memory locations, each of which serves for the storage of a block. In a simple organization, these blocks may have a fixed length. Memory location 50 comprises a descriptor location. This location contains a validity bit V (40), a modification bit D (42) and a registration bit R (44). There is also provided space for a so-called identifier or tag 46 which identifies the contents of the memory location. This tag can indicate, for example an address or address portion or segment number. The memory location also comprises a section 48 for the storage of the actual user information. The memory location 52 is organized in the same way but has a larger storage capacity. The memory location 54 is again organized in the same way, although there are provided two modification bits and two registration bits which characterize each time a respective section of the location 54. Thus, it can be indicated whether a modification has taken place in the first section or in the second section of this memory location. At reference numeral 60 the bit positions which are denoted by a cross are irrelevant to the descriptor; therefore they may be available for user information.

When the relevant processor wishes to read given information, first the foreground memory in a further associative organization (not elaborated herein for the sake of simplicity) is addressed in order to check whether the relevant information is present therein. If this is not the case, the relevant information block is copied to an empty position in the foreground memory; for this position the validity bit had the value "non-valid". In response to copying, the associated validity bit becomes "valid", the modification bit becomes "unmodified", and the registration bit becomes "unregistered". When the relevant block was present in the foreground memory, however, the read operation is performed immediately thereafter. When the relevant block is not present in the foreground memory and no free location is available either, ousting/expulsation takes place. In accordance with a given algorithm, for example the "least-recently used (LRU)" algorithm, a block is selected, its contents are copied to the main memory, and its location is filled with the new information. The three indication bits then become "valid", "unmodified" and the last bit retains its state; a state "registered" is thus maintained.

When the relevant processor wishes to write given information, first the foreground memory is addressed in an associative organization in the same way as in the case of a read operation in order to verify whether the memory space intended for the relevant information has been copied to the foreground memory. This memory space may already have been filled or not. This is because empty space may be present in a block for further information to be inserted. When the relevant block is not present in the foreground memory, it is copied thereto, if necessary, in the same way as described for read operations. Subsequently, the new information is written into the foreground memory at the correct location. During this write operation, the following operations are performed in one sequence or another:

if the validity bit was "non-valid" (for example it concerned an empty block), the validity bit is set to "valid";

the modification bit is set to "modified" in order to indicate that copying to the main memory will be required at some instant;

the physical foreground memory address of the relevant block is stored in the registration memory and the registration bit of the memory block is set to "registered".

Subsequently, the foreground memory is ready for a next access operation by the local processor.

FIG. 3 shows a block diagram of a registration memory. The memory comprises a section 62 which is organized as a RAM. The capacity of each memory location suffices for pointer information for one of the addresses in the foreground memory. There is also provided a starting address counter 64 and a final address counter 66. The starting address counter stores the position where the first registration pointer may be written. The final address counter stores where the next registration pointer may be written. Initially the two counter positions are the same. During registration, the position of the final address counter is each time incremented until, for example at the most, via an overflow, the position of the final address counter equals that of the starting address counter.

The following cases exists where information must be copied in the main memory in the case of modification:

a,b. The previously described cases a, b which are known as ousting and flushing, respectively.

c. The case where an overflow condition occurs in the registration memory. This can be prevented by keeping the number of memory locations in the registration memory smaller than the number of modification bits of the foreground memory. In that case the memory locations of the registration memory are successively interrogated and the information thus indicated in the foreground memory is copied to the same location in the main memory where the obsolete version of the information was present. The modification bit of the version in the foreground memory is then set to "unmodified" and the registration bit is set to "non-registered". This interrogation can be realized by incrementing the starting address counter as well as by decrementing the final address counter. Interrogation is terminated when a comparison of the starting address and the final address reveals that all registered memory locations have been copied to the main memory. An example of the foregoing is obtained when the foreground memory comprises 1024 locations and the registration memory comprises 64 locations. The overflow condition can be cancelled per se by copying only a limited number of memory blocks to the main memory. In principle one block already suffices in many cases.

d. Finally it may be that generally relevant information is present; this situation will occur only when the system comprises at least two processors. Herein, processors are to be understood to include control units, for example of peripheral apparatus, which can independently cause modifications of the memory contents. Such a modification can arise, for example in the case of a so-called direct memory access (DMA). In that case a consistency problem may occur: when a plurality of processors require the same information, they must also have identical information available. The latter problem can be solved in various ways. A first possibility is that it is inhibited to store the relevant shared information in the foreground memory. A second possibility is that enequal priorities are assigned to the different processors: a given processor becomes the "proprietor" of the information and can behave itself as if the information were only important to itself. All other processors must warn the proprietor processor immediately when the information is modified and must supply this processor with the modification, or they must attempt to become proprietor of the relevant information themselves. In the latter case only the proprietor possesses the right to modify. A third possibility consists in that the shared information may be stored in the various foreground memories, but copying in the main memory always takes place together with a warning to the other processors that inconsistency exists; this is realized in that a special detector (spy) is provided which detects the relevant address on the address bus. Mechanisms as described in this paragraph can also be used beyond the scope of the present invention.

The following is a final possibility for the occurrence of an overflow condition in the foreground memory. When a memory block in the foreground memory is ousted by another block, three possibilities exist:

the relevant memory block is unmodified; to that case no copying in the main memory is required;

the relevant memory block is modified; in that case it is copied and replaced by a new memory block; when the registration bit is not provided, it is not known whether a pointer for the relevant block is present in the registration memory; consequently registration, if any, remains in force. When the new block is modified again, the modification bit is modified but it is not known that registration has already taken place. New registration then takes place. This mechanism can in principle continue until the registration memory is completely filled. The latter strategy itself is not very unattractive in view of the time required for updating, because registration of an unmodified memory block need not lead to copying, so that little time is lost when the relevant address in the registration memory is addressed. The only drawback is that the overflow condition is more liable to occur, thus halting the process being executed in the relevant processor at that instant.

An overflow condition in the registration memory can thus have two causes:

for the memory blocks in the foreground memory multiple registration can take place (i.e. no registration bit is provided). This cause is eliminated by use of the registration bit;

the chose registration memory is too small. When the registration bits are provided and the number of addresses of the registration memory is greater than or equal to the number of locations to be registered in the foreground memory, overflow can no longer occur.

I claim:

1. A method of operating a cache, comprising the steps of:

writing data to a location in a foreground memory included in the cache in response to a write transaction;

setting a modified bit in the foreground memory location to indicate that the data therein must later be written back to a main memory;

checking a registration bit in the foreground memory location to determine whether the address thereof has been registered;

writing the address of the foreground memory location to a registration memory included in the cache if the registration bit is not set;

setting the registration bit in conjunction with writing the address of the foreground memory location to the registration memory to indicate that the address has been registered;

selecting the foreground memory location to store new data required by a subsequent transaction;

checking the modified bit to determine whether the data stored in the foreground memory location must be written back to a main memory before the foreground memory location may be used to store the new data;

writing the data stored in the foreground memory location back to the main memory if the modified bit is set;

filling the foreground memory location with the new data while retaining the address thereof in the registration memory and the previous state of the registration bit; and clearing the modified bit in conjunction with filling the foreground memory location with the new data.

* * * * *